United States Patent [19]

Yonezawa et al.

[11] Patent Number: 5,005,371
[45] Date of Patent: Apr. 9, 1991

[54] ADSORPTION THERMAL STORAGE APPARATUS AND ADSORPTION THERMAL STORAGE SYSTEM INCLUDING THE SAME

[75] Inventors: Yasuo Yonezawa, Nara; Toshiya Ohnishi, Sakai; Shin'ichi Okumura, Ohtsu; Akiyoshi Sakai, Toyonaka; Hiroki Nakano; Masao Matsushita, both of Neyagawa; Atsushi Morikawa; Motoshi Yoshihara, both of Yawata, all of Japan

[73] Assignee: Nishiyodo Air Conditioner Co., Ltd., Osaka, Japan

[21] Appl. No.: 525,745

[22] Filed: May 18, 1990

[30] Foreign Application Priority Data

Sep. 4, 1989 [JP] Japan ................................. 1-228853

[51] Int. Cl.[5] ............................................. F25B 27/00
[52] U.S. Cl. ..................................... 62/238.6; 62/480; 165/10 A
[58] Field of Search ..................... 62/238.6, 238.7, 480; 165/10 A

[56] References Cited

U.S. PATENT DOCUMENTS

| | | | |
|---|---|---|---|
| 2,024,083 | 12/1935 | Young | 62/480 X |
| 3,828,566 | 8/1974 | Wetzel | 62/480 X |
| 4,402,188 | 9/1983 | Skala | 165/10 A |
| 4,653,287 | 3/1987 | Martin, Jr. | 62/238.6 X |
| 4,694,659 | 9/1987 | Shelton | 62/480 X |
| 4,727,726 | 3/1988 | Mitani et al. | 62/238.6 |

Primary Examiner—Lloyd L. King
Attorney, Agent, or Firm—Flynn, Thiel, Boutell & Tanis

[57] ABSTRACT

An adsorption thermal storage apparatus formed of an evacuated vessel comprising therein a refrigerant, and an adsorbent heating or cooling section and a refrigerant condensing or evaporating section located in communication with each other, the former section including an adsorbent and finned heat transfer tubes, the latter section including heat transfer tubes placed in dishes. An adsorption thermal storage system comprising the aforesaid apparatus; a heat source (e.g. a condenser of a compression refrigerator) for adsorbent heating; a cold source (e.g. an evaporator) for refrigerant condensation; an exothermic heat source (e.g. cooling tower); an endothermic heat source (e.g. air cooling coil); and a utilization equipment (e.g. air conditioner), the foregoing elements being connected so that during thermal storage period, the adsorbent heating or cooling section and the refrigerant condensing or evaporating section communicate with the heat source and the cold source, respectively, whereas during utilization period, the adsorbent section communicates with the exothermic heat source or heat utilization equipment and the refrigerant section communicates with cold utilization equipment or the endothermic heat source. By the desorption, the refrigerant is condensed and thermal energy is stored whereas cold is generated by latent heat of evaporation of the refrigerant liquid and heat, by adsorption heat of the refrigerant vapor, whereby heat and cold may be utilized singly or simultaneously.

16 Claims, 13 Drawing Sheets

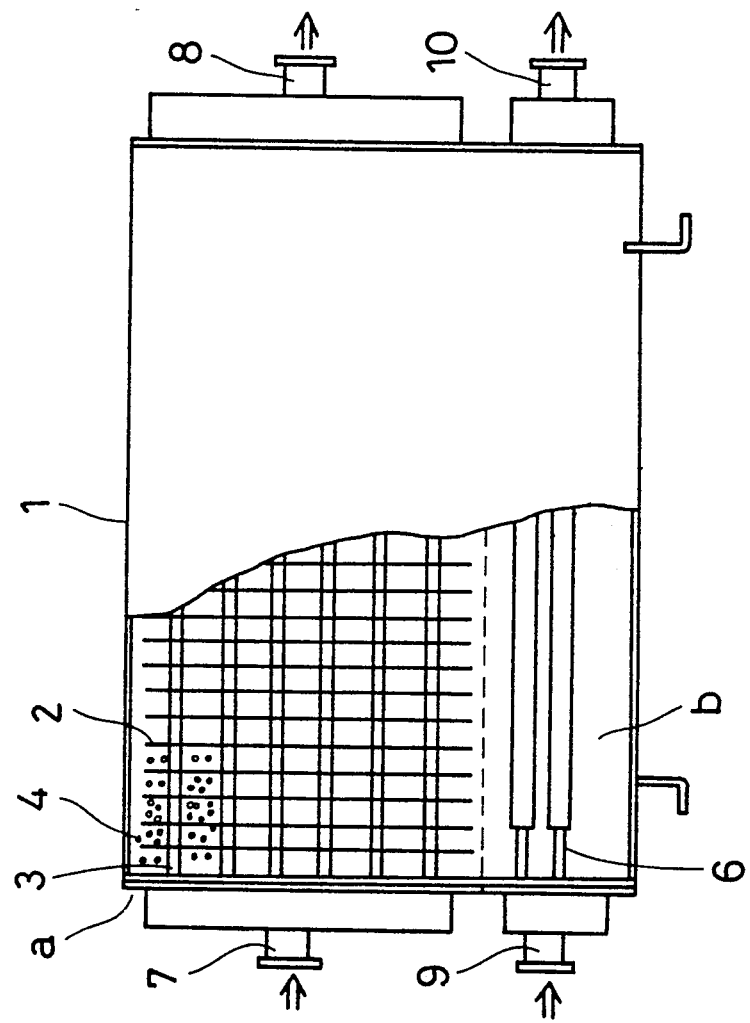
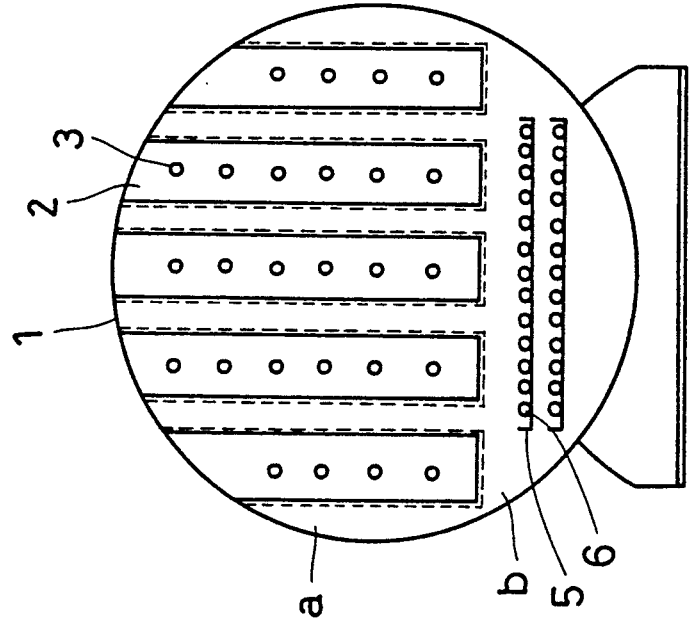

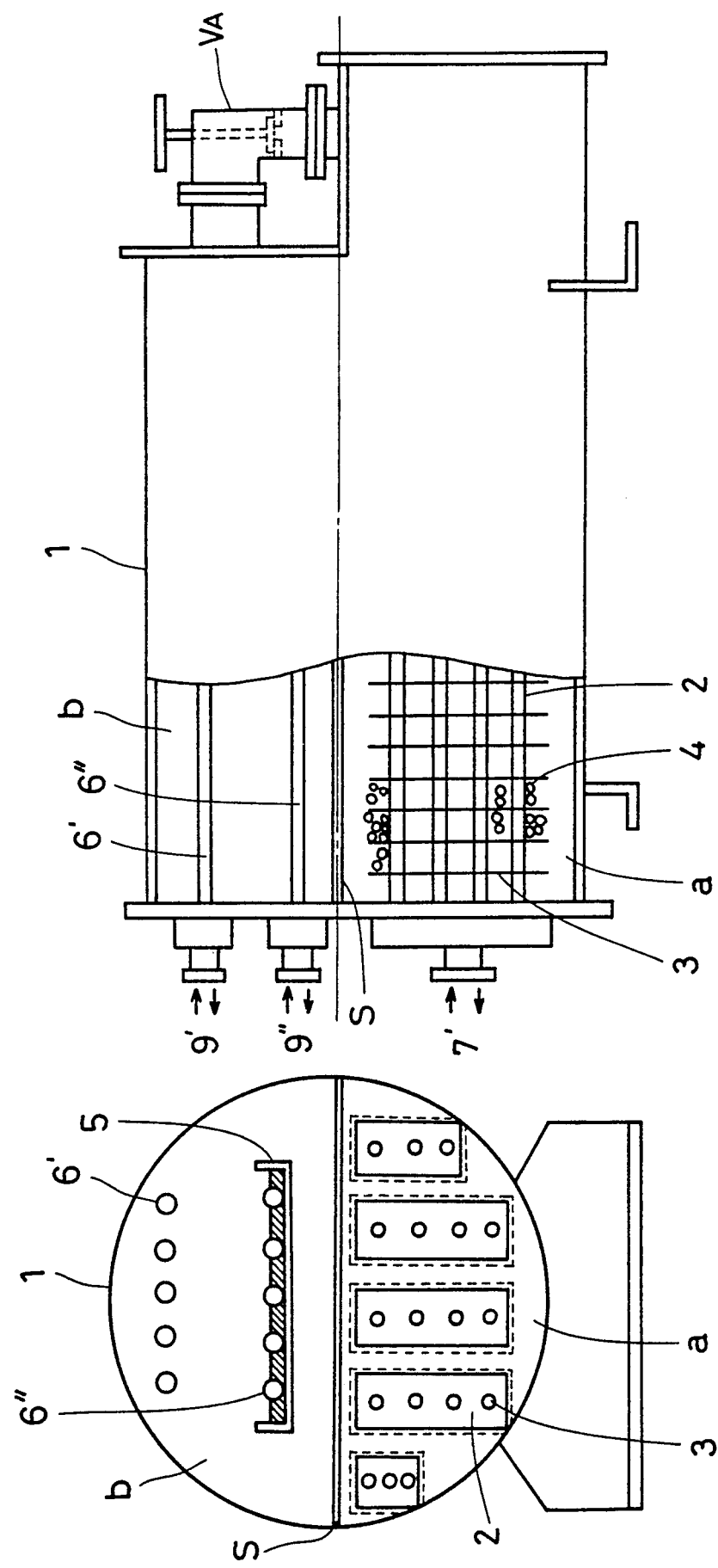

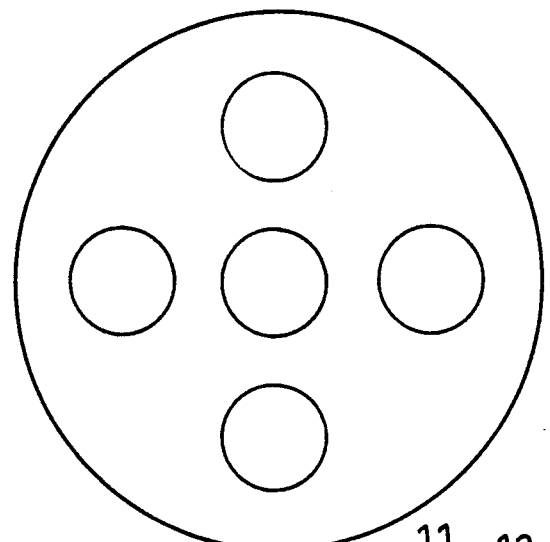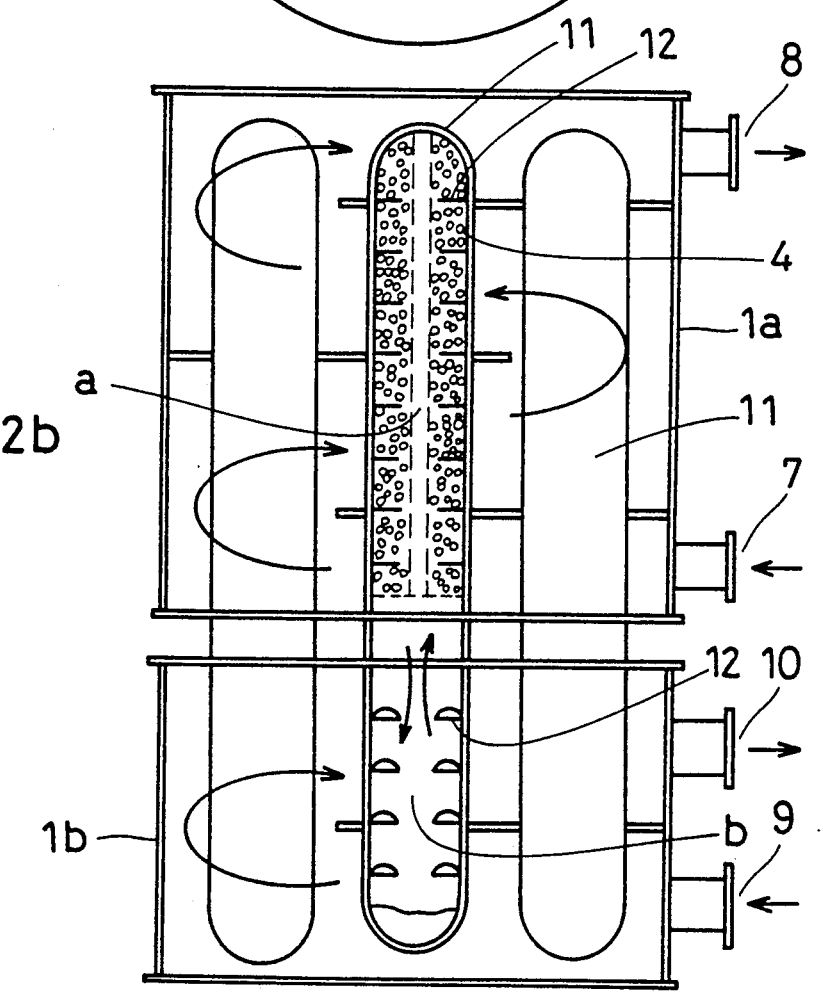

ADSORPTION THERMAL STORAGE APPARATUS AND ADSORPTION THERMAL STORAGE SYSTEM INCLUDING THE SAME

BACKGROUND OF THE INVENTION

1. Field of the Invention

This invention relates to an adsorption thermal storage apparatus and an adsorption thermal storage system including the apparatus. More particularly, this invention is concerned with the aforesaid apparatus and the thermal storage system particularly suitable for propelling the leveling of consumption of electric power by utilizing nighttime electric power.

2. Statement of Prior Art

Recent increase in demand for electric power is noticeable and it especially poses a social problem that the demand for electric power shows a tendency to be concentrated in the daytime.

In order to cope with this tendency and to level off the utilization of electric power, so-called thermal storage systems have received attention in the field of air conditioning equipment for space heating or space cooling in which a refrigerator is run in the nighttime when the capacity of electric power is relatively replete to thereby store thermal energy, and the thermal energy is utilized in the form of cold (lower-temperature heat) and heat (higher-temperature heat) in the daytime when the demand for electric power is elevated.

Here, throughout the specification and claims, the terms, "cold" and "heat" are used to mean heat of a lower temperature and heat of a higher temperature, respectively, than the environmental temperature.

At the present time, known thermal energy storage systems include, for example, a water thermal storage system wherein thermal energy is stored by sensible heat of water, ice thermal storage system wherein thermal energy is stored by the latent heat melting of ice, a thermal storage system utilizing a thermal storage material, etc.

Each of the thermal storage systems has both advantages and disadvantages, and consequently, these systems are utilized selectively and appropriately in accordance with the intended purposes.

However, a difficulty with the water thermal storage system is that in order to obtain required cold and heat, a large quantity of water is necessitated for thermal energy storage, and accordingly, is in need of a considerably huge thermal storage tank, as a result of which the overall system is made large-sized.

The ice thermal storage system doesn't require such a huge tank, but is forced to reduce appreciably the evaporation temperature of a refrigerator since thermal energy is stored in the form of ice at 0° C. Because of this, the lowering of thermal storage efficiency is unavoidable. Furthermore, the system is not suited to equal thermal storage for cold and heat because the thermal storage quantity for heat is appreciably slight as compared with that for cold, being ¼ to 1/5 time.

With the system utilizing a thermal storage material, the thermal storage material per se is considerably expensive and short in lifetime, and distinct thermal storage materials must be used for cold and heat, which makes the piping system complicated.

In order to solve the problems above with the existing thermal storage systems, this invention has been accomplished and is designed to provide an improved thermal storage apparatus and an ameliorated thermal storage system including 10 the apparatus, which system permits to make the overall system compact, to enhance the thermal storage efficiency when nighttime electric power is used, and to permit equalized thermal storage for cold and heat.

SUMMARY OF THE INVENTION

According to one aspect of this invention for meeting the foregoing objects, there is provided an improved adsorption thermal storage apparatus having an evacuated vessel which comprises therein a refrigerant, and an adsorbent heating or cooling section and a refrigerant condensing or evaporating section located in communication with each other, the adsorbent heating or cooling section including an adsorbent and first heat transfer means supporting thereon the adsorbent and having heat transfer surfaces for heating or cooling the adsorbent therethrough, the first heat transfer means being adapted to be connected to a heat source for adsorbent heating, an exothermic heat source and utilization means, the refrigerant condensing or evaporating section including second heat transfer means for holding the refrigerant liquid and having heat transfer surfaces for condensing or evaporating the refrigerant therethrough, the second heat transfer means being adapted to be connected to a cold source for refrigerant condensation, an endothermic heat source, and the utilization means, which apparatus is constructed so that thermal energy is stored by heating the adsorbent through the first heat transfer means to cause desorption of the refrigerant in gaseous state and condensing the gaseous refrigerant through the second heat transfer means whereas cold is generated by latent heat of evaporation of the refrigerant liquid through the second heat transfer means and heat is generated by heat of adsorption of the desorbed adsorbent through the first heat transfer means, and the cold and heat may be utilized singly or simultaneously.

According to another aspect of this invention, an adsorption thermal storage system is provided, which comprises: an adsorption thermal storage apparatus having an evacuated vessel comprising therein a refrigerant, and an adsorbent heating or cooling section and a refrigerant condensing or evaporating section located in communication with each other, the adsorbent heating or cooling section including an adsorbent and first heat transfer means supporting thereon the adsorbent and having heat transfer surfaces for heating or cooling the adsorbent therethrough, the refrigerant condensing or evaporating section including second heat transfer means for holding the refrigerant and having heat transfer surfaces for condensing or evaporating the refrigerant therethrough; a heat source for heating the adsorbent adapted to be connected to the first heat transfer means; a cold source for condensing the refrigerant adapted to be connected to the second heat transfer means; an exothermic heat source for cooling the adsorbent adapted to be connected to the first heat transfer means; an endothermic heat source for evaporating the refrigerant adapted to be connected to the second heat transfer means; and utilization means adapted to be connected the first and second heat transfer means; the adsorption thermal storage apparatus, the heat source, the cold source, the exothermic heat source, the endothermic heat source, and the utilization means being interconnected so that when the system is operated, during thermal storage period, thermal energy is stored by putting the heat source and cold source, respectively, in communication with the first and second heat transfer means, thereby to desorb the refrigerant in gaseous state and condense it in liquid state whereas during utilization period, cold is generated by putting the exothermic heat source and utilization means in communication with the first and second heat transfer means, respectively, and heat is generated by putting the endothermic heat source and utilization means in communication with the second and first heat transfer means, respectively, thereby to evaporate the refrigerant liquid and adsorb it in liquid state, tho cold and heat being utilized singly or simultaneously.

In the adsorption thermal storage system as stated above, according to another embodiment, the system is operated so that during the utilization period, the heat source and the cold source are put in communication with the first and the second heat transfer means, respectively, as is the case with the thermal storage period, whereby further low-temperature cold and further high-temperature heat are generated and can be utilized singly or simultaneously.

More specifically stated, where the heat source and the cold source are a compression refrigerator, its condenser and evaporator, respectively, and the compression refrigerator is driven by the nighttime electric power, it is petered that thermal energy is stored in the nighttime whereas cold and heat are generated and utilized in the daytime. Consequently, such system is advantageous from the economical viewpoint in that leveling of the consumption of electric power is attained and the operation cost of the system is curtailed owing to more economical nighttime electric power fare.

The utilization means for utilizing cold or heat may be an air conditioner for space heating or space cooling, a cold water supply equipment or a hot water supply equipment.

In the adsorption thermal storage system thus constructed, during thermal storage period, the adsorbent is heated in the adsorbent heating or cooling section through the first heat transfer means by putting it in communication with the heat source, and refrigerant vapor is given off from the adsorbent, concurrently with which the refrigerant vapor is cooled in the refrigerant condensing or evaporating section through the second heat transfer means by putting it in communication with the cold source whereby the refrigerant is condensed on the heat transfer surfaces in liquid state.

During the utilization period, in the refrigerant condensing or evaporating section, the refrigerant liquid is evaporated by putting the second heat transfer means in communication with, so-to-speak, a utilization side heat source (the utilization means for cooling or endothermic heat source) to generate latent heat of evaporation whereby cold is made available whereas in the adsorbent heating or cooling section, the desorbed adsorbent is cooled by putting the first heat transfer means in communication with, so-to-speak, a utilization side cold source (the exothermic heat source or utilization means for heating) to adsorb the refrigerant vapor given off on the adsorbent and release adsorption heat whereby heat is made available. Here, the cold and heat may be utilized singly or simultaneously.

Where the cold and heat are utilized simultaneously, a combination of the utilization means for cooling and the exothermic heat source or a combination of the endothermic heat source and the utilization means for heating is possible, and the exothermic heat source in the former and the endothermic heat source in the latter serve as a utilization means for heating and a utilization means for cooling, respectively. Examples of such combination of cold and heat include an air conditioner for space cooling and a hot water supply equipment; an air conditioner for space heating and a cold water supply equipment; etc.

Conversely where the cold or heat is utilized singly, the other heat and cold obtained in the exothermic heat source in the former and the endothermic heat source in the latter are not used and discarded. Examples of the endothermic heat source and the exothermic heat source include, respectively, an air cooling coil or waste hot water; and a cooling tower.

Particularly where the heat source for heating the adsorbent and the cold source for condensing the refrigerant are a compression refrigerator, its condenser and evaporator, respectively, in the nighttime, the system is operated to store thermal energy by nighttime electric power whereas in the daytime, the compression refrigerator is stopped and the thermal energy is utilized as cold and/or heat. As a result, more efficient utilization of energy and levelling of the consumption between the daytime and nighttime of electric power are attained.

The heat source for heating the adsorbent and the cold source for condensing the refrigerant may be waste heat such as waste hot water and a cooling tower, respectively whereby further economical utilization of heat and cold is made possible.

BRIEF DESCRIPTION OF THE DRAWINGS

FIG. 1a and FIG. 1b are schematic views of one example of an adsorption thermal energy storage apparatus according to this invention showing its side elevational view in cross-section and its front elevational view in partial cross-section, respectively; and FIG. 1c and FIG. 1d are schematic views of a variant of the adsorption thermal storage apparatus shown in FIGS. 1a and 1b, showing its side elevational view in cross-section and its front elevational view in partial cross-section, respectively.

FIG. 2a and FIG. 2b are schematic views of another example of an adsorption thermal storage apparatus according to this invention showing an internal plan view and an internal elevational view in partial cross-section, respectively.

DETAILED DESCRIPTION OF THE PREFERRED EMBODIMENTS

Figure 3:
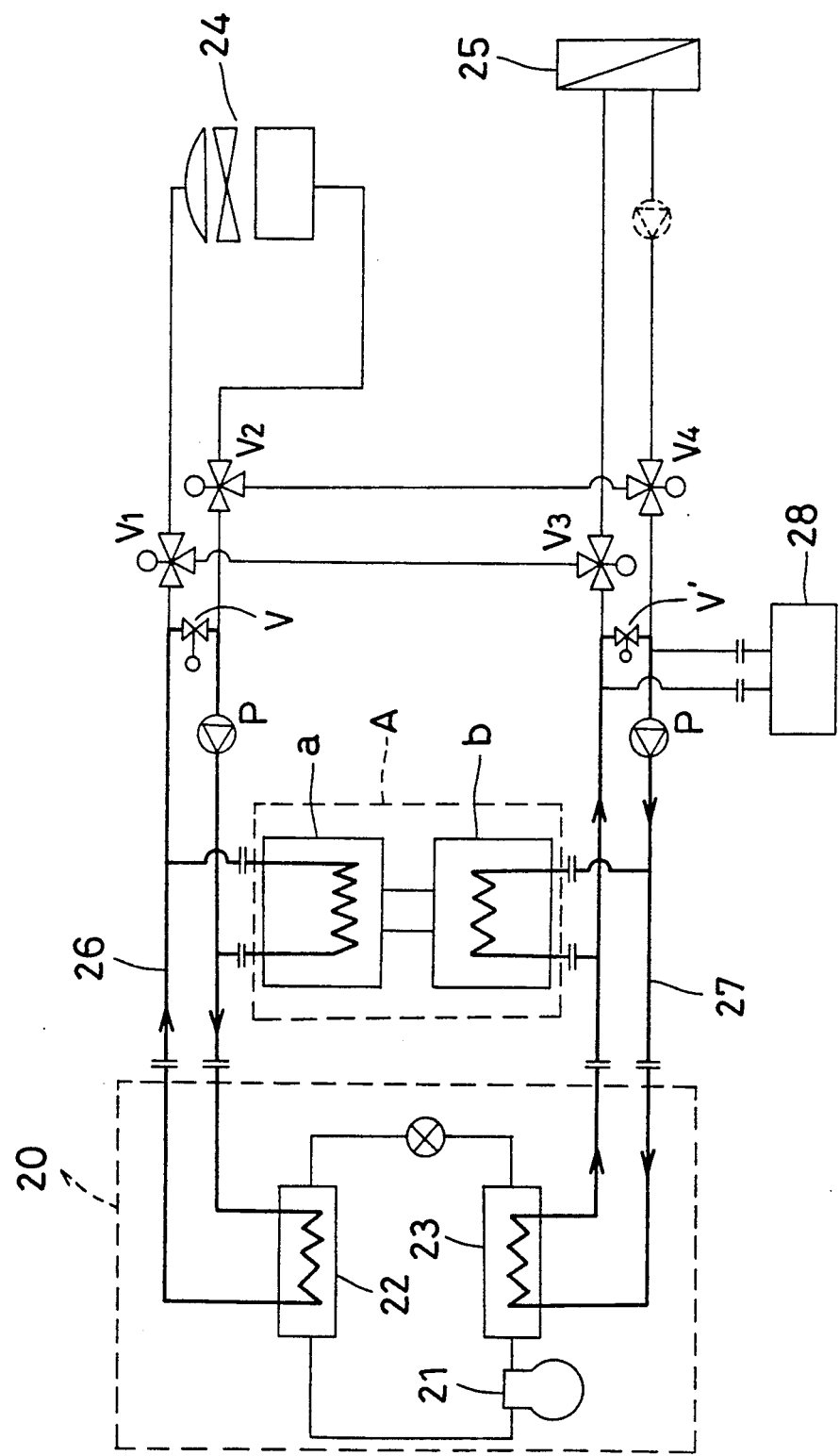
FIG. 3 to FIG. 7 are diagrammatic plumbing views of one embodiment of an adsorption thermal storage system according to this invention, showing a thermal storage mode, space cooling mode, powerful space cooling mode, space heating mode, and powerful space heating mode, respectively when the system is operated.

Examples of the adsorption thermal storage apparatus and the adsorption thermal storage system of this invention will be hereinbelow described in more detail in conjunction with the accompanying drawings.

FIG. 1 and FIG. 2 show each main elements of an adsorption thermal storage apparatus pertaining to this invention.

Referring to FIGS. 1a and 1b, the apparatus is formed of a laterally elongated cylindrical vessel 1 which is internally maintained in vacuum and sealed with a refrigerant. The upper part of the vessel 1 forms an adsorbent heating or cooling section a wherein a plurality of heat transfer tubes 3 having a plurality of fins 2 arranged axially in parallel and orthogonally to the tubes are vertically disposed in rows at given intervals to constitute heat transfer surfaces, and an adsorbent material 4 is packed and held between respective files of fins. Each file of the fins 2 intervening the adsorbent material 4 therebetween is covered with a net to support and retain the adsorbent (as shown by broken lines).

On the other hand, the lower part of the vacuum vessel 1 constitutes a refrigerant condensing or evaporating section b which comprises refrigerant holding surfaces 5 in the form of axially elongated dishes and a plurality of heat transfer tubes 6 placed in the dishes, which tubes may have fins or may not.

The adsorbent heating or cooling section a and the refrigerant condensing or evaporating section b are located in communication with each other thereby to allow the refrigerant to flow through both sections a and b. Both sections a and b may be formed within the vessel 1 without any separation or partition means (FIGS. 1a and 1b) or may be separated by a separator or partition wall S (FIGS. 1c, 1d). In the latter case, both sections a and b are adapted to communicate with each other through a pipeline equipped with an on-off valve $V_A$ for routing therethrough the refrigerant vapor (FIG. 1d) located externally of the vessel 1.

In one example as shown in FIGS. 1a and 1b, the heat transfer tubes 3 in the adsorbent heating or cooling section a and the heat transfer tubes 6 in the refrigerant condensing or evaporating section b are each united together at, for example, water chambers at both sides of the cylindrical vessel 1. The heat transfere tubes 3 are connected to an inlet 7 and an outlet 8 disposed outside the vessel 1, both for a heat transfer medium on the heat source side and the utilization side. Likewise, the heat transfer tubes 6 are connected, through the water chambers, to an inlet 9 and an outlet 10 located outside the vessel, both for a heat transfer medium on the cold source side and the utilization side.

FIGS. 1c and 1d show a variant example of the aforesaid example shown in FIGS. 1a and 1b.

In the adsorbent heating or cooling section a located in the lower part, the heat transfer tubes 3 are connected to a port 7' for the ingress and egress of a heat transfer medium. On the other hand, in the refrigerant condensing or evaporating section b located in the upper part, for the purposes of the condensation and evaporation, distinct heat transfer tubes are used, namely, heat transfer tubes 6' only for condensation and heat transfer tubes 6" only for evaporation placed in the dish 5.

The heat transfer tubes 6' for condensation are externally connected to a port 9' for the ingress and egress of a heat transfer medium for condensation, and the heat transfer tubes 6" for evaporation are connected externally to a port 9" for the ingress and egress of a heat transfer medium for evaporation.

Both adsorbent heating or cooling section a and refrigerant condensing or evaporating section b are, ordinarily, in communication with each other with the valve $V_A$ opened, except that the utilization of cold and/or heat is stopped, in which the valve $V_A$ is closed. By the provision of the valve $V_A$, it is possible to store excess thermal energy thereby to avoid wasteful utilization.

The thermal storage apparatus shown in FIG. 2 is of the same principle as that of FIG. 1, but is constructed of a plurality of integrally formed, vertically elongated vacuum tubes 11 each having the adsorbent heating or cooling section a and the refrigerant condensing or evaporating section b, instead of separate heat transfer tubes 3 and 6. The heat transfer tubes 11 are housed in a container 1a on the upper section side and in a container 1b on the lower section side.

Each vacuum tube or evacuated tube 11 is provided, on its inner wall, with a plurality of fins 12 up and down, and is packed, at its upper half, with an adsorbent material 4 between the upper fins 12 and provides, at its lower half, refrigerant holding surfaces by the lower fins 12.

The upper fins 12 and the upper wall of the vacuum tube 11 thus form heat transfer tubes for heating or cooling the adsorbent therethrough whereas the lower fins 12 and the lower wall of the vacuum tube 11 form heat transfer surfaces for condensing or evaporating the refrigerant therethrough.

Likewise as in FIGS. 1a and 1b, the upper container 1a is connected to the inlet 7 in order that the heat source, etc. may heat or cool the adsorbent 4 through the heat transfer surfaces during thermal storage period or utilization period whereas the lower container 1b is connected to the inlet 9 and the outlet 10 in order that the cold source, etc. may cause condensation or evaporation of the refrigerant in the evacuated tubes 11 through their heat transfer surfaces during thermal storage period or utilization period.

In the construction of the adsorption thermal storage apparatus as described above, the adsorbent material to be usually used includes, for example, silica gel, activated charcoal, activated alumina, zeolite, etc. in granular form or shaped form, and the refrigerant which can be used includes, for example, water, freons, alcohols, etc.

The foregoing apparatus is further constructed so that thermal energy can be stored by heating the adsorbent 4 with the first heat transfer means connected to a heat source to give off the refrigerant in gaseous state and simultaneously condensing it in liquid state with the second heat transfer means connected to a cold source whereas cold is generated by the latent heat of evaporation of the refrigerant liquid and heat is generated by the heat of adsorption when gaseous refrigerant is adsorbed in liquid state, and the cold and heat can be utilized singly or simultaneously.

FIG. 3 to FIG. 13 show examples of adsorption thermal storage systems each incorporating the adsorption thermal storage apparatus A as described above and various operation odes of them, for example, including an economical and efficient operation by means of a compression refrigerator utilizing nighttime electric power.

In accordance with respective examples, each adsorption thermal storage system comprises the adsorption thermal storage apparatus A as illustrated in FIG. 1 or FIG. 2 pertaining to this invention; an energy supply side apparatus 20 including a heat source 22 for heating the adsorbent and a cold source 23 for condensing the refrigerant; and a utilization side apparatus including an exothermic heat source 24, a utilization equipment 25 and an endothermic heat source 28, all connected through pipelines.

Now each example will be described.

In an example shown in FIG. 3 to FIG. 7, the adsorption thermal storage system comprises the adsorption thermal storage apparatus A; a compression refrigerator 20 of a known construction including a compressor 21, a condenser 22 and an evaporator 23; and a cooling tower 24, an air conditioner 25 and an air-cooling coil 28. This system is applicable to air conditioning operation for space cooling or space heating, or hot water or cold water supply operation.

FIG. 3 shows a thermal storage mode when the adsorption thermal storage system is operated, wherein the condenser 22 of the compression refrigerator 20 serves to heat the adsorbent to desorb the refrigerant in gaseous state, concurrently with which the evaporator 23 cools the refrigerant vapor to condense it in liquid state. Thermal energy storage is thus performed by heat from the condenser and cold from the evaporator 23 as shown in bold lines. At that time, the first heat transfer means in the adsorbent heating or cooling section a of the adsorption thermal storage apparatus A is put in communication with the condenser 22 through an on-off valve V whereas the second heat transfer means in the refrigerant condensing or evaporating section b is put in communication with the evaporator 23 through an on-off valve V'. Usually this thermal storage operation is carried out during nighttime by utilizing nighttime electric power, and accordingly, cold and heat are generated and utilized during the daytime. This operational embodiment permits to level off the utilization of electric power.

The adsorbent heating or cooling section a of the adsorption thermal storage apparatus A is connected to the cooling tower 24 via change-over valves such as three-way valves $V_1$, $V_2$ interposed in the heat-releasing side pipeline 26 whereas the refrigerant condensing or evaporating section b is connected to the air conditioner 25 through change-over valves such as three-way valves $V_3$, $V_4$ interposed in the heat-absorbing pipeline 27. Mutually opposed three-way valves $V_1$, $V_3$ and $V_2$, $V_4$ are connected to each other, respectively.

Pumps P are provided in the heat-releasing side pipeline 26 and heat-absorbing side pipeline 27. The on-off valves V and V' are provided in the adsorbent heating or cooling pipeline common to the heat-releasing side pipeline 26 and in the refrigerant condensing or evaporating pipeline common to the heat-absorbing side pipeline 27, respectively.

In the heat-absorbing side pipeline 27, the endothermic heat source 28 such as waste hot water is interposed so as to be in communication with the refrigerant condensing or evaporating section b.

Figure 4:
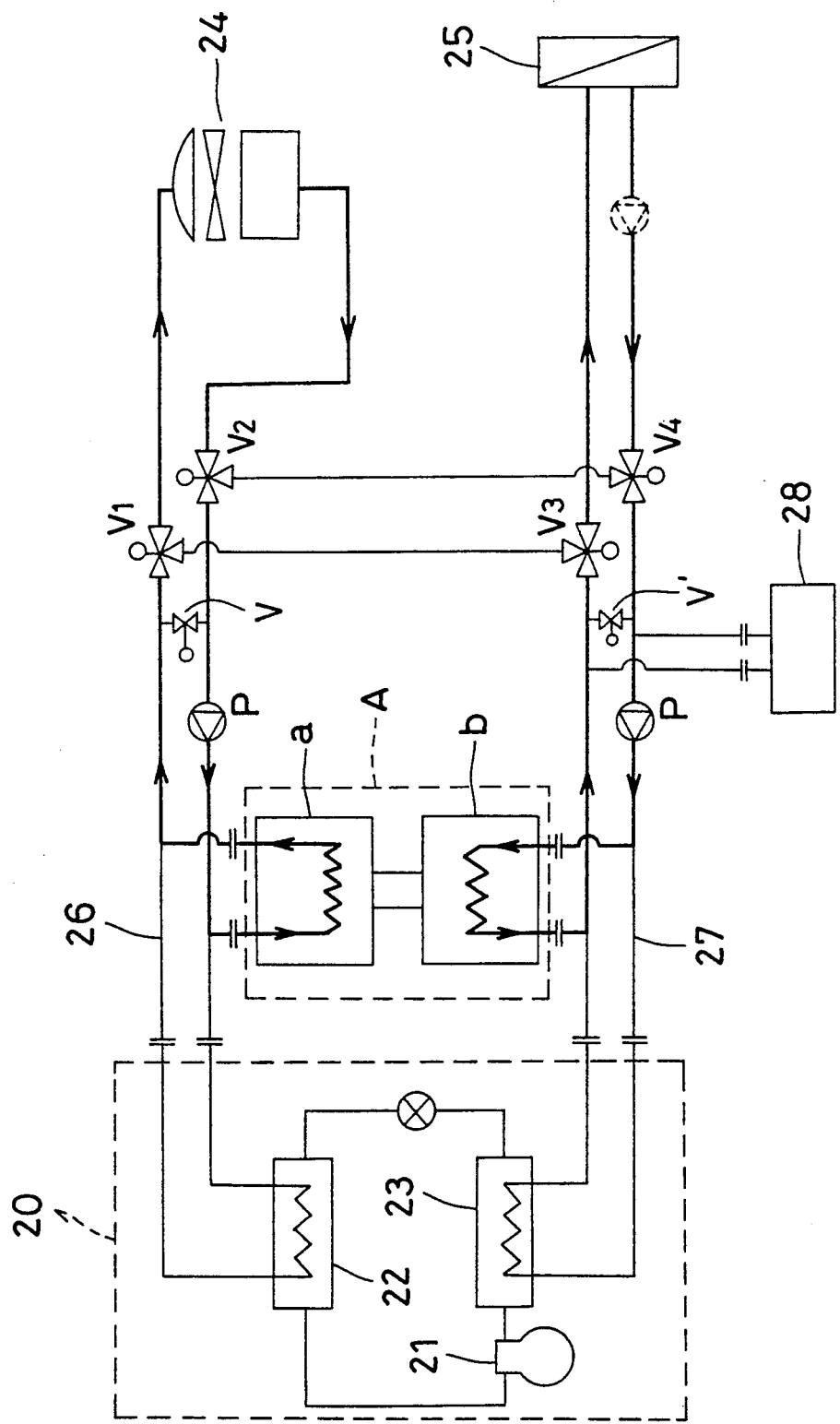

FIG. 4 illustrates a space cooling operational mode, more particularly, a daytime cooling operational mode wherein the compression refrigerator 20 is stopped and thermal energy stored by the thermal storage operation as shown in the bold lines in FIG. 3 is utilized.

The communication manner of the pipelines upon operation is shown in bold lines.

The on-off valves V, V' are closed, the three-way valves $V_1$, $V_2$ are manipulated so as to put the heat-releasing side pipeline 26 in communication with the cooling tower 24 as an exothermic heat source, and the three-way valves $V_3$, $V_4$ are manipulated to put the heat-absorbing side pipeline 27 in communication with the air conditioner 25.

At this time, adsorption occurs in the adsorbent heating or cooling section a of the adsorption thermal storage apparatus A and adsorption heat given off from the adsorbent material 4 is released to the cooling tower 24. Concurrently, cold is generated in the refrigerant condensing or evaporating section b by latent heat of evaporation of the refrigerant and supplied to the air conditioner 25, which is operated for space cooling.

Figure 5:
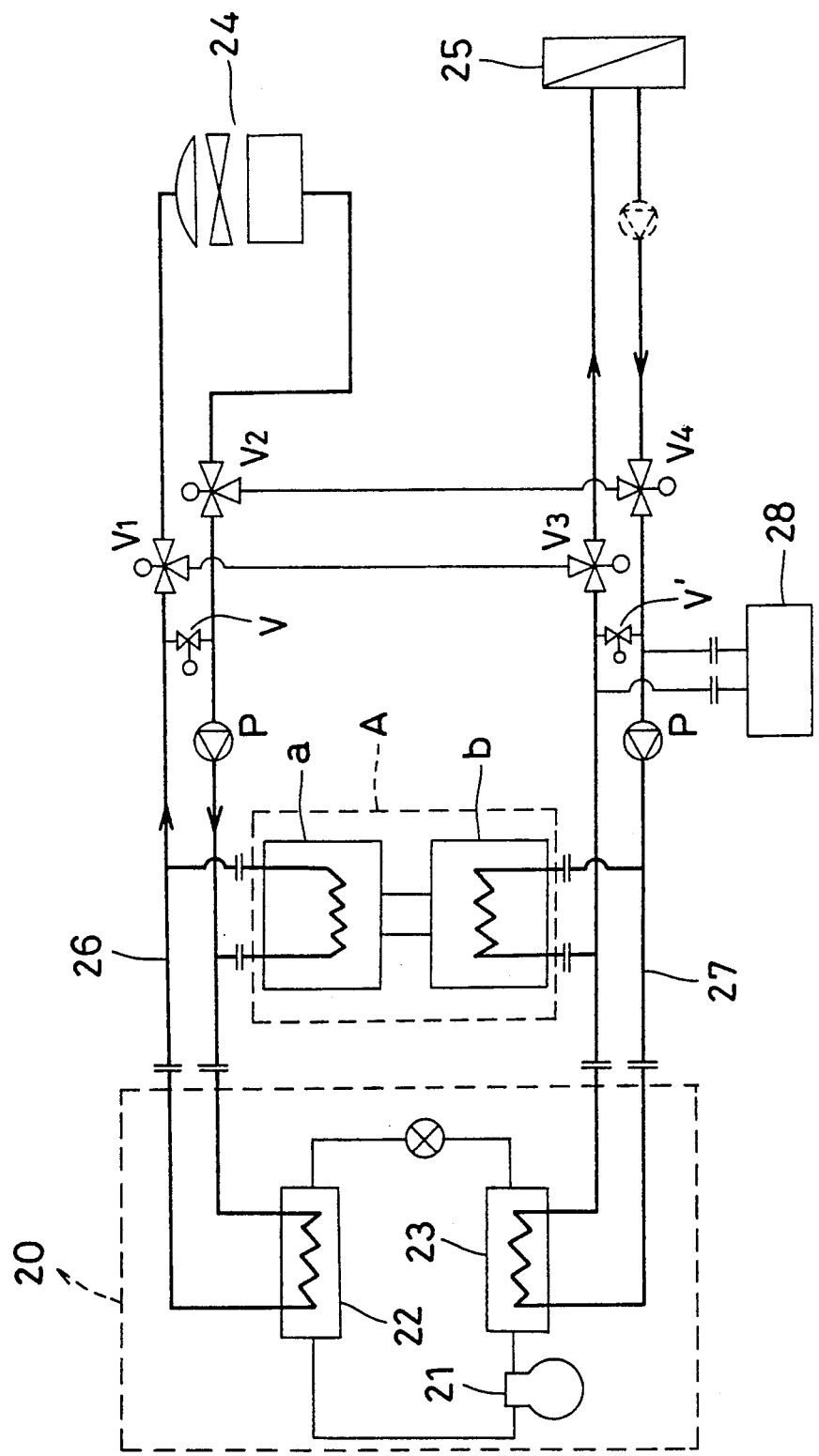

During this utilization period, it is also possible to simultaneously drive the compression refrigerator 20 as is the case with the thermal storage operation mode. This high powered space cooling operation mode is shown in FIG. 5. In this case, since the compression refrigerator 20 acts as a usual refrigerator, both cold fed from the cold source of the refrigerator 20 and cold generated from thermal energy stored are supplied to the air conditioner 25, so that more efficient space cooling operation is permitted.

On the other hand, heat generated from thermal energy stored by thermal storage operation can be utilized for space heating operation.

Figure 6:
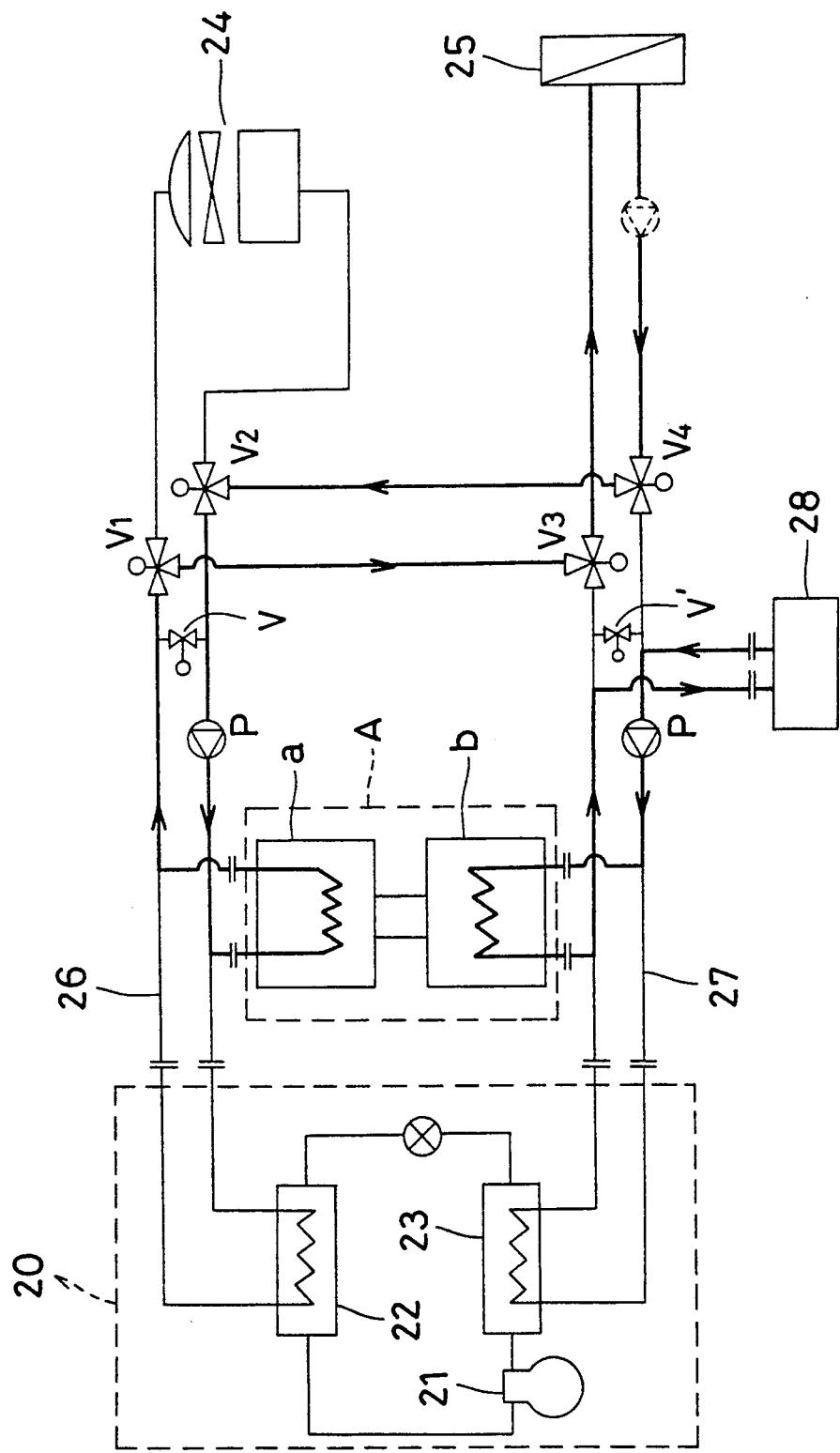

FIG. 6 shows such space heating operational mode.

The on-off valves V, V' are closed and the three-way valves $V_1$, $V_2$ are manipulated to put the heat-releasing side pipeline 26 in communication with the air conditioner 25 and the three-way valves $V_3$, $V_4$ are manipulated to put the heat-absorbing side pipeline 27 in communication with the endothermic heat source 28. Heat is generated by adsorption action to the adsorbent 4 in the section a of the adsorption thermal storage apparatus A and supplied to the air conditioner 25 whereas a definite amount of heat is imparted to the heat transfer tubes of the refrigerant condensing or evaporating section b from the endothermic heat source 28 thus avoiding temperature dropping of the heat transfer surfaces due to latent heat of evaporation of the refrigerant.

As the endothermic heat source, an air cooling coil may be generally used, but when the environmental temperature falls, for example, in the winter season, it is preferred to replace the air cooling coil with waste hot water or the like.

Figure 7:
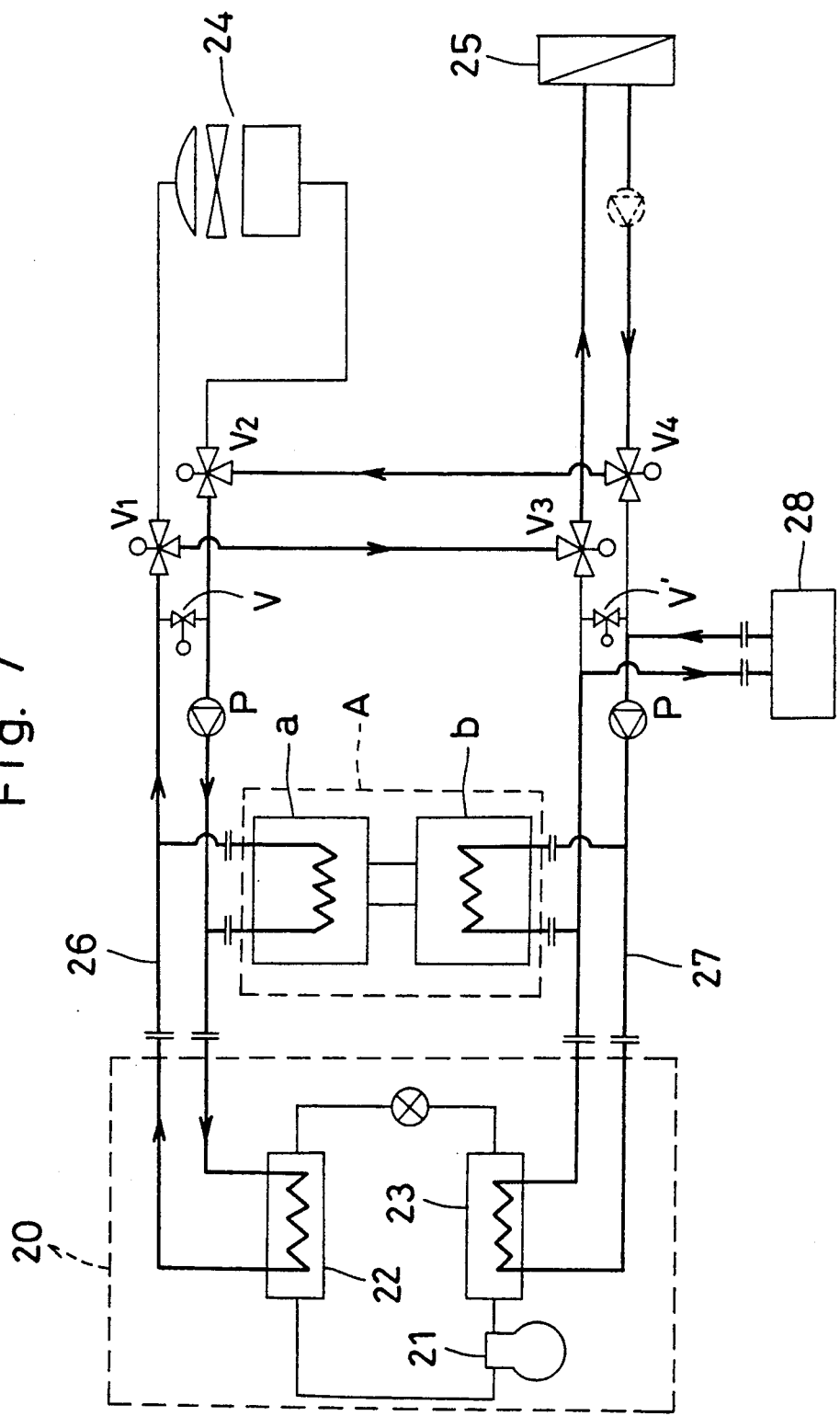

It is similarly possible to drive the compression refrigerator 20 simultaneously with the space heating operation as described above, thereby to permit more efficient space heating operation. This high-powered operation mode is shown in FIG. 7. The compression refrigerator 20 serves to supply the air conditioner 25 with heat, as a usual refrigerator, and consequently, affords a good heating effect together with the heat generated by the thermal energy stored.

The foregoing example is shown in various modes of FIG. 3 to FIG. 7 wherein cold or heat is singly utilized, but is not limited to these modes and further modes are also possible. For example, the system may comprise a hot-water supply equipment 24 instead of the cooling tower 24 or may comprise a cold-water supply equipment 28 instead of the air-cooling coil 28, whereby a combination of hot-water supply and air conditioning for space heating or another combination of cold water supply and air conditioning for space heating can be obtained. Such modes of utilizing both cold and heat are especially suitable in a high-powered operation where compression refrigerator is driven also in the utilization period (e.g., in the daytime) as is the case with FIG. 5 and FIG. 7.

Figure 8:
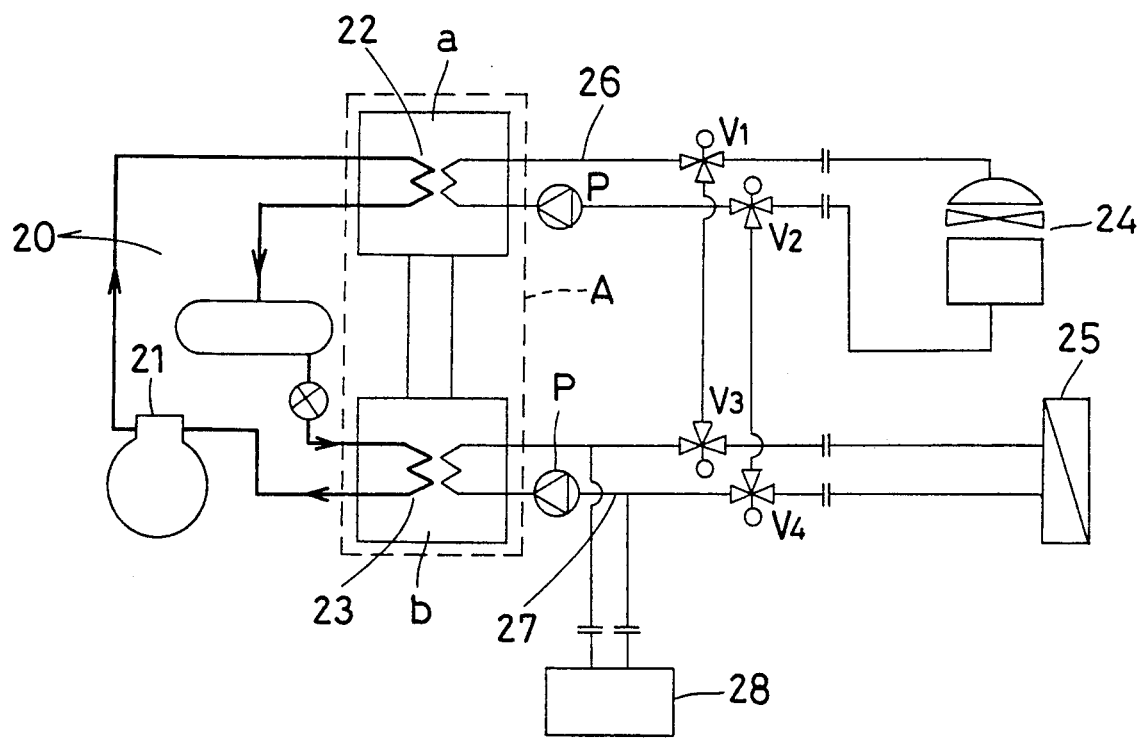
FIG. 8 to FIG. 10 are diagrammatic plumbing views of another embodiment of an adsorption thermal storage system according to this invention, showing a thermal storage mode, space cooling mode and space heating mode, respectively, when the system is operated.
Figure 9:
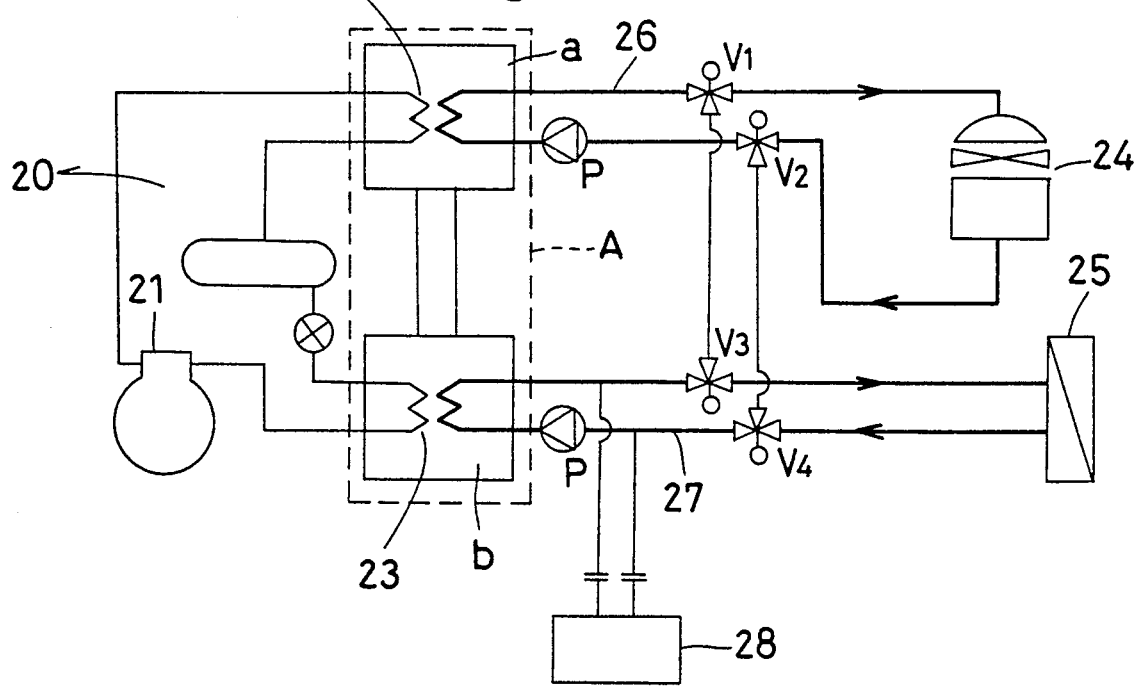
Figure 10:
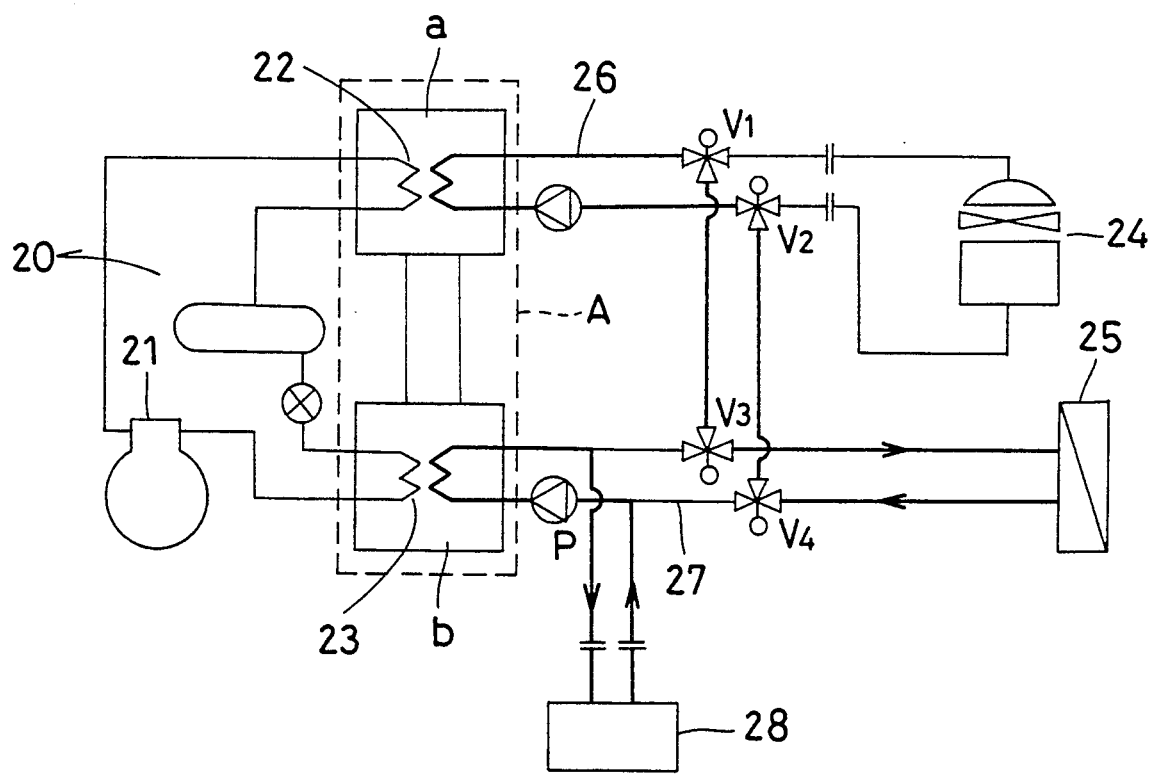

Another example of an adsorption thermal storage system is shown in FIG. 8 to FIG. 10, wherein it is possible to incorporate the condenser 22 of the compression refrigerator 20 in the adsorbent heating or cooling section a within the evacuated vessel 1 and to incorporate the evaporator 23 in the refrigerant condensing or evaporating section b. The condenser 22 and the evaporator 23 thus provide heat transfer surfaces for the section a and the section b, respectively.

When the compression refrigerator 20 is operated as shown in FIG. 8, the heat generated in the condenser 22 and the cold generated in the evaporator 23 directly act upon, respectively, the heat transfer surfaces in the adsorbent heating or cooling section b of the apparatus A to cause desorption and condensation actions, whereby thermal energy storage is likewise performed. No pipelines short-circuiting the ingress and egress paths of the heat-releasing side pipeline 26 and heat-absorbing side pipeline 27 are needed, accordingly.

The operation of air conditioning for space cooling shown in FIG. 9 and the operation of air conditioning for space heating shown in FIG. 10 are possible only by manipulating the three-way valves $V_1$, $V_2$, $V_3$, $V_4$ in a similar manner to the manipulation above. It is likewise possible to use waste hot water as the endothermic heat source 28 thereby to enhance space heating capacity.

With this construction, the system per se can be miniaturized more than the case with the foregoing example.

As described above, the embodiments stated above in which the compression refrigerator 20 is combined with the adsorption thermal storage apparatus A permit to use economical nighttime electric power to perform thermal storage operation, which contributes to the leveling of electric power consumption.

Of course, it should be understood that the exothermic heat source 24, endothermic heat source 28 and utilization means 25 are not necessarily limited to the cooling tower, air-cooling coil and air conditioner in the examples above.

Measurement was made of the heat quantity stored with the adsorption thermal storage system shown in FIG. 3 and yielded the result that cold was 120 kcal/kg and heat was 152 kcal/kg per 1 kg of adsorbent material.

This data is only illustrative, but considering the fact that only 80 kcal/kg can be stored with ice as known well, it will be appreciated that the thermal storage system according to this invention is relatively superior.

Further, it is also possible to use waste hot water 20' as a heat source for heating the adsorbent and a cold source for condensing the refrigerant, instead of the compression refrigerator 20 in the above examples.

Figure 11:
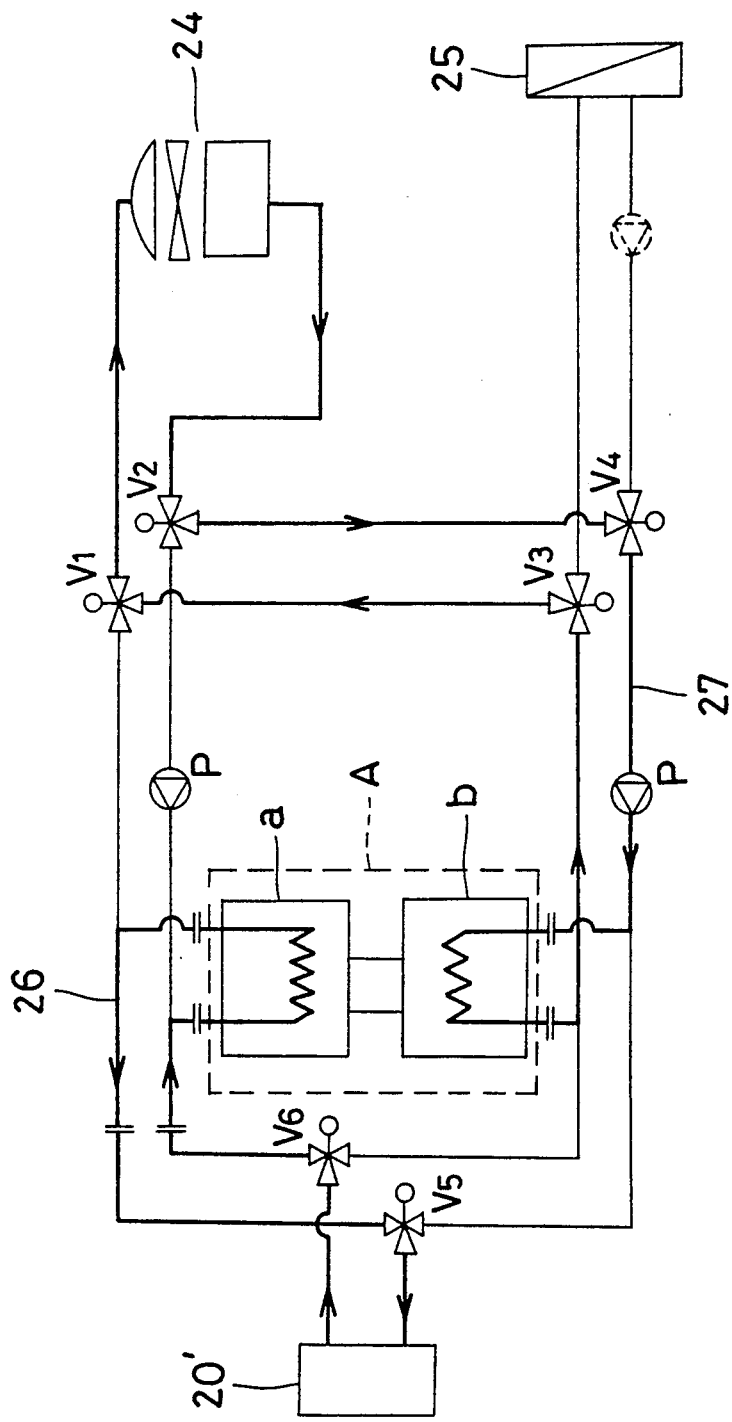
FIG. 11 to FIG. 13 are diagrammatic plumbing views of further embodiment of an adsorption thermal storage system according to this invention, showing a thermal storage mode, space cooling mode and space heating mode, respectively, when the system is operated.
Figure 12:
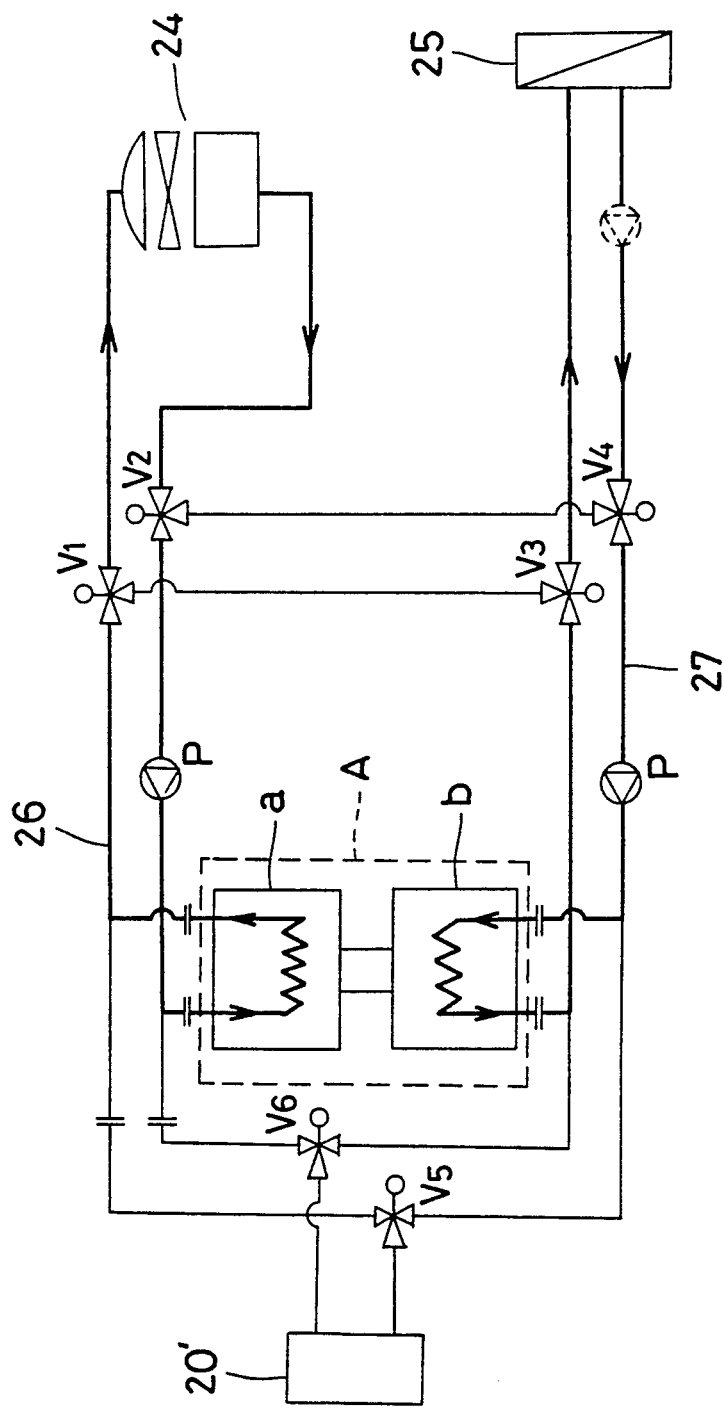
Figure 13:
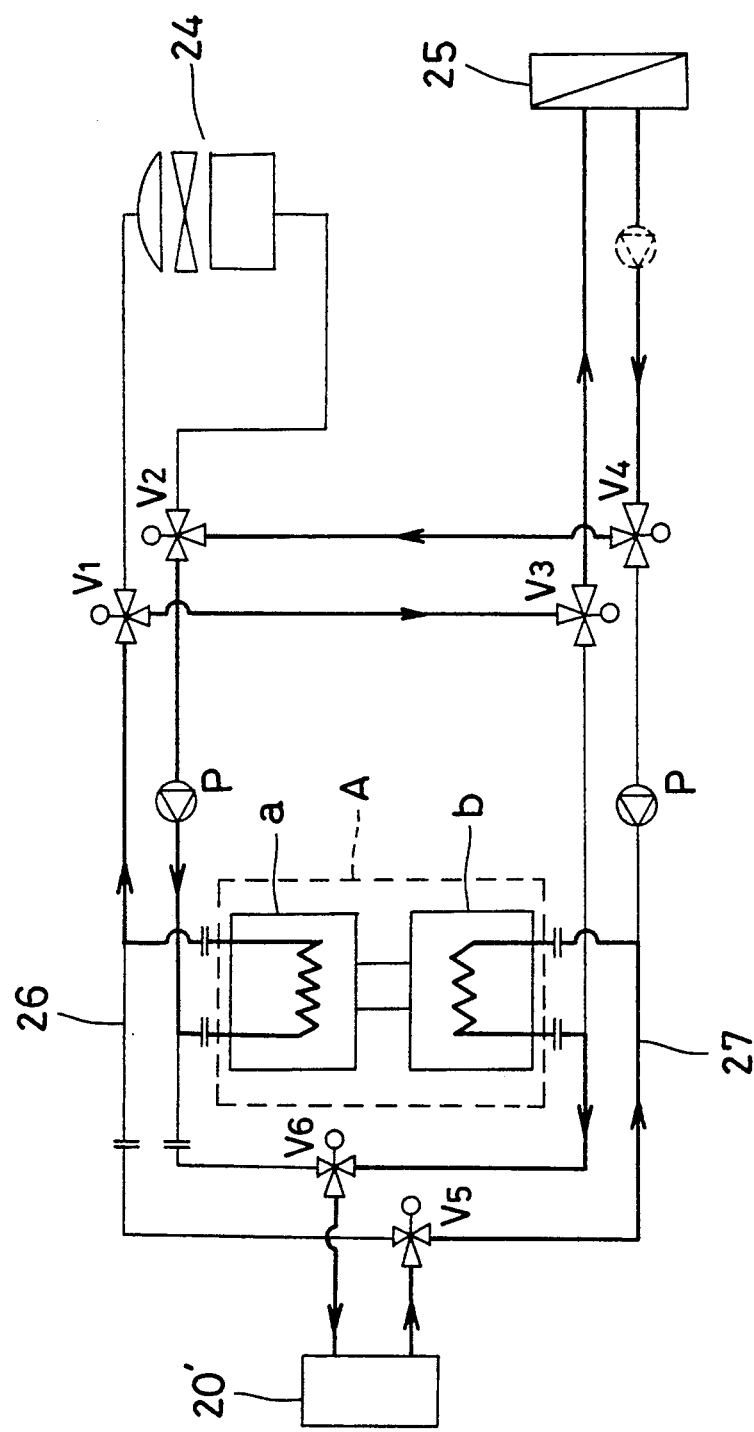

FIGS. 11 to 13 are each a plumbing diagram showing such example wherein the essential elements are similar to the above except for the elements 20 and 28 in the foregoing figures.

According to a thermal storage mode shown in FIG. 11, the adsorbent 4 in the adsorbent heating or cooling section a is heated by the waste hot water 20' fed through a three-way valve $V_6$ via the heat-releasing side pipeline 26, concurrently with which the refrigerant condensing or evaporating section b is put in communication with the exothermic heat source 24 through the three-way valves $V_1$, $V_2$, $V_3$, $V_4$ and the refrigerant is cooled by a heat transfer medium circulating through the exothermic heat source 24. As a result, desorption action occurs in the section a and the desorbed refrigerant gas is condensed upon cooling in the section b whereby thermal energy is stored.

Space cooling operation mode is shown in FIG. 12, wherein the supply of waste hot water is stopped and the manipulation of the three-way valves $V_1$, $V_2$, $V_3$, $V_4$ put the adsorbent heating or cooling section a (the heat transfer tubes) in communication with the cooling tower 24 and the refrigerant condensing or evaporating section b (the heat transfer tubes) in communication with the air conditioner 25. When the adsorbent heating or cooling section a is supplied with cold from the cooling tower 24, adsorption action occurs and simultaneously, the refrigerant is evaporated in the section b to generate latent heat of evaporation. The cold is thus supplied to the air conditioner 25 for space cooling. Here, if the utilization means 25 is a cold water supply equipment, the system can be operated to supply cold water.

Space heating operation or hot-water supply operation is shown in FIG. 13, wherein the heat transfer tubes in the refrigerant condensing or evaporating section b are put in communication with the waste hot water 20' through a three-way valve $V_5$ and the heat transfer tubes in the adsorbent heating or cooling section a are put in communication with an air conditioner or a hot water supply equipment 25 by the switching of the three-way valves $V_1$, $V_2$, $V_3$, $V_4$. The refrigerant liquid in the section b is evaporated by the waste hot water 20' (heat source) and adsorbed on the desorbed adsorbent 4 to generate heat of adsorption, whereby heat is available to the air conditioner for space heating or hot-water supply equipment 25.

While the invention has been described with reference to several embodiments thereof, it will be apparent to those skilled in the art that various modifications to the adsorption thermal storage apparatus and the adsorption thermal storage system pertaining to this invention can be made without departing from the scope of the appended claims.

What is claimed is:

1. An adsorption thermal storage apparatus formed of an evacuated vessel which comprises therein a refrigerant, and an adsorbent heating or cooling section and a refrigerant condensing or evaporating section located in communication with each other, said adsorbent heating or cooling section including an adsorbent material and first heat transfer means supporting thereon the adsorbent and having heat transfer surfaces for heating or cooling the adsorbent therethrough, said first heat transfer means being adapted to be connected to a heat source for heating the adsorbent, and an exothermic heat source and utilization means on a utilization side, said refrigerant condensing or evaporating section including second heat transfer means holding refrigerant liquid and having heat transfer surfaces for condensing or evaporating the refrigerant therethrough, said second heat transfer means being adapted to be connected to a cold source for condensing the refrigerant, and an endothermic heat source and the utilization means on the utilization side, which apparatus is constructed so that thermal energy is stored by heating the adsorbent through the first heat transfer means to cause desorption of the refrigerant in gaseous state and condensing the gaseous refrigerant through the second heat transfer means whereas cold is generated by latent heat of evaporation of the refrigerant liquid through the second heat transfer means and heat is generated by heat of adsorption of the desorbed adsorbent through the first heat transfer means, and said cold and heat may be utilized singly or simultaneously.

2. An adsorption thermal storage apparatus as set forth in claim 1, wherein said first heat transfer means and said second heat transfer means are separately located, and the first heat transfer means includes heat transfer tubes with a plurality of fins and the second heat transfer means includes heat transfer tubes and dishes for holding therein the refrigerant and the heat transfer tubes.

3. An adsorption thermal storage apparatus as set forth in claim 1, wherein said evacuated vessel further comprises internally a partition wall separating said adsorbent heating or cooling section and said refrigerant condensing or evaporating section and externally a pipeline equipped with a valve capable of stopping the communication between the adsorbent heating or cooling section and the refrigerant condensing or evaporating section.

4. An adsorption thermal storage apparatus as set forth in claim 3, wherein said first heat transfer means includes heat transfer tubes with a plurality of fins, and said second heat transfer means includes heat transfer tubes for condensation and heat transfer tubes for evaporation and a dish for holding therein the refrigerant.

5. An adsorption thermal storage apparatus as set forth in claim 1, which comprises a plural number of said evacuated vessels.

6. An adsorption thermal storage apparatus as set forth in claim 5, wherein each of said first heat transfer means and each of said second heat transfer means integrally constitute a heat transfer tube provided internally with a plurality of fins, the body of said heat transfer tube constituting said evacuated vessel.

7. An adsorption thermal storage system comprising:
an adsorption thermal storage apparatus formed of an evacuated vessel which comprises therein a refrigerant, and an adsorbent heating or cooling section and a refrigerant condensing or evaporating section located in communication with each other, said adsorbent heating or cooling section including an adsorbent and first heat transfer means supporting thereon the adsorbent and having heat transfer surfaces for heating or cooling the adsorbent therethrough, said refrigerant condensing or evaporating section including second heat transfer means holding the refrigerant and having heat transfer surfaces for condensing or evaporating the refrigerant therethrough;
a heat source for heating the adsorbent adapted to be connected to the first heat transfer means;
a cold source for condensing the refrigerant adapted to be connected to the second heat transfer means;
an exothermic heat source for cooling the adsorbent adapted to be connected to the first heat transfer means;
an endothermic heat source for evaporating the refrigerant adapted to be connected to the second heat transfer means; and utilization means for cold or heat adapted to be connected to the first and second heat transfer means;
said adsorption thermal storage apparatus, said heat source, said cold source, said exothermic heat source, said endothermic heat source and said utilization means being inter-connected so that when said system is operated, during thermal storage period, thermal energy is stored by putting the heat source and the cold source, respectively, in communication with the first and the second heat transfer means, thereby to desorb the refrigerant in gaseous state and condense it in liquid state whereas during utilization period, cold is generated by putting the exothermic heat source and the utilization means, respectively, in communication with the first and the second heat transfer means, and heat is generated by putting the endothermic heat source and the utilization means, respectively, in communication with the second and the first heat transfer means, thereby to evaporate the refrigerant and adsorb it in liquid state, said cold and heat being utilized singly or simultaneously.

8. An adsorption thermal storage system as set forth in claim 7, wherein said heat source and said cold source are housed in said adsorption thermal storage apparatus.

9. An adsorption thermal storage system as set forth in claim 7, wherein when said system is operated, during said utilization period, the heat source and the cold source are put in communication with the first and the second heat transfer means, respectively, whereby further low-temperature cold and further high-temperature heat are generated and utilized singly or simultaneously.

10. An adsorption thermal storage system as set forth in claim 7, wherein said exothermic heat source is a cooling tower; said endothermic heat source, an air cooling coil or waste hot water; and said utilization means, an air conditioner, a cold water supply equipment or a hot water supply equipment, whereby cold or heat is utilized.

11. An adsorption thermal storage system as set forth in claim 9, wherein said exothermic heat source, said endothermic heat source and said utilization means are, respectively, a cooling tower or a hot water supply equipment; an air cooling coil or waste hot water, or a cold water supply equipment; and an air conditioner whereby cold and heat are utilized simultaneously.

12. An adsorption thermal storage system as set forth in claim 10, wherein said heat source and said cold source are a condenser and an evaporator, respectively, of a compression refrigerator.

13. An adsorption thermal storage system as set forth in claim 11, wherein said heat source and said cold source are a condenser and an evaporator, respectively, of a compression refrigerator.

14. An adsorption thermal storage system as set forth in claim 12, wherein said thermal storage period is nighttime, and said utilization period is daytime, and said compression refrigerator is driven by nighttime electric power.

15. An adsorption thermal storage system as set forth in claim 13, wherein said thermal storage period is nighttime and said utilization period is daytime, and said compression refrigerator is driven by nighttime electric power.

16. An adsorption thermal storage system as set forth in claim 7, wherein said heat source and said endothermic heat source are each waste hot water; said cold source and said exothermic heat source are each a cooling tower; and said utilization means is an air conditioner, a cold water supply equipment or a hot water supply equipment.

* * * * *